June 20, 1944.    R. PLACE    2,351,634
METHOD OF PRODUCING ANIMATED CARTOONS
Filed June 6, 1935    2 Sheets-Sheet 1

Inventor
Robert Place
By R P Schulze
Attorney

June 20, 1944. R. PLACE 2,351,634
METHOD OF PRODUCING ANIMATED CARTOONS
Filed June 6, 1935 2 Sheets-Sheet 2

Inventor
Robert Place
By R P Schulze
Attorney

Patented June 20, 1944

2,351,634

UNITED STATES PATENT OFFICE 2,351,634

METHOD OF PRODUCING ANIMATED CARTOONS

Robert Place, Boston, Mass., assignor to Place Process Inc., Glen Cove, N. Y.

Application June 6, 1935, Serial No. 25,309
Renewed March 25, 1939

12 Claims. (Cl. 88—16)

The present invention relates to improvements in the production of moving pictures and, more particularly, comprehends methods of producing animated cartoon pictures.

In prior methods of making animated cartoons, the artist's drawings are hand-traced with black India ink on individual sheets of transparent Celluloid, after which the ink tracings are opaqued with a layer of tone or color-producing material on the reverse side of the Celluloid sheets. Each Celluloid sheet is then superposed upon a sheet bearing a painted or other reproduction of a suitable background and the composite picture is photographed to produce a master negative. Many disadvantages characterize the foregoing practice, most pronounced of which may be mentioned the time and expense incident to hand tracing of the artist's drawings on the large number of individual Celluloid sheets necessary to produce a complete series of animated pictures and the inaccuracies resulting from hand mounting each Celluloid sheet before the camera to be photographed. Further, in the above practice, the traced and opaqued Celluloid sheets when once photographed, are ill adapted for storage for future use to employ the same action scenes on different backgrounds because of the bulk of the sheets and because the tracings and opaque coatings deteriorate and become obliterated.

Among the objects of the present invention are to overcome or greatly reduce the foregoing and other disadvantages of heretofore known methods and in this connection, to devise a novel method whereby better animated pictures may be produced more quickly and at less cost.

A feature of the invention comprises photographically reproducing the artist's drawings upon Celluloid or other transparent medium with the accompanying advantage of eliminating the slow and inaccurate hand tracing step. As a further advantage of this feature, any tone or color in line can be consistently produced by varying the exposure or by bleaching and dyeing the film, whereas black lines only can consistently be obtained by the tracing method because of the necessary use of black India ink. Such Celluloids or transparent mediums upon which the animated drawings have been photographically reproduced have the further object and advantage over ink-traced Celluloids in that they may be stored over long periods of time without deterioration and re-used whenever a similar action is wanted in a future film.

Another feature of the invention, and one of major importance, resides in photographically reproducing the drawings to be animated in series upon successive frames of a strip or roll of Celluloid or other transparent medium and thus to dispense with the prior practice of providing an individual Celluloid sheet for each one of the drawings of the series. Objects and advantages of providing such a step, in addition to the reduction in labor and cost of materials, are numerous and include the following; the necessary application of toning or shading material or opaquing of the figures on the strip is facilitated in that the strip may be merely unreeled before the worker instead of involving the separate handling of a large number of individual sheets; whereas a traced drawing is of the same size as the artist's drawing, the photographic reproduction on the strip of the artist's drawing in my invention can be reduced to any desired size for more convenient opaquing with resultant saving in time and material; whereas in prior practice the background must be of a size to correspond with the traced figures comprising the foreground superposed thereon, the backgrounds for use with the strips of my invention need not be of corresponding size since difference in size or proportion can be compensated by merely varying the distance between the strip and background when the same are positioned before the camera reproducing the master negative; and in this manner of backgrounding, effective lighting or shading of the background can be produced without disturbing the foreground figures.

Other objects and advantages of the present invention will be apparent from the following detailed explanation thereof taken in conjunction with the accompanying drawings which are illustrative of a preferred embodiment.

Figure 1:
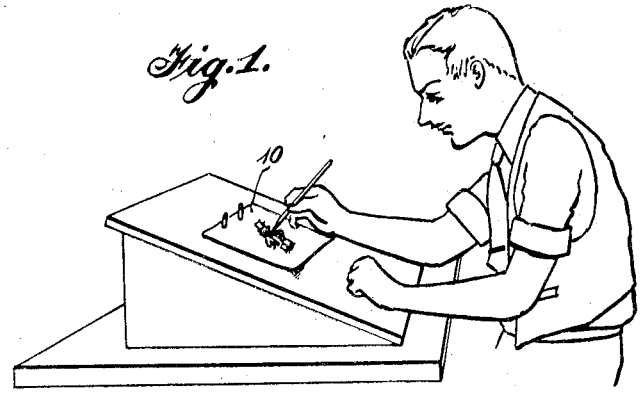
Fig. 1 is a perspective view illustrating preparation of the usual artist's drawings.

As indicated in Figure 1, the first step in the practice of the present invention includes the provision of the usual sequence or series of artist's drawings 10. However, since the drawings are to be photographed instead of traced, they may vary from the conventional type in any manner which may be found suitable.

Figure 2:
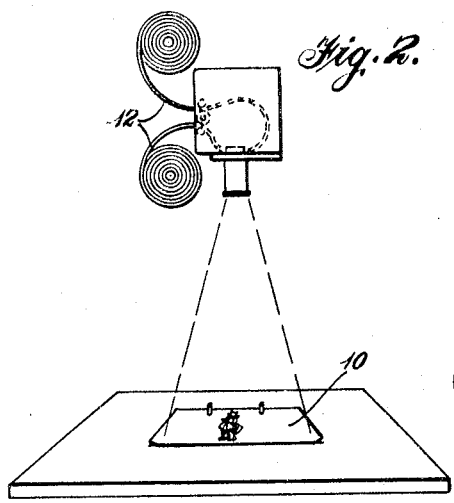
Fig. 2 is a diagrammatic view showing the step of photographing the artist's drawings in series on successive frames of a sensitized film.

The series of drawings 10 are photographed as indicated in Figure 2 upon successive frames of any movie film or roll film 12 which may be of standard width if desired, by positioning the same consecutively before the camera and exposing the progressing film to consecutively photograph each drawing, thus to provide a very contrasty line negative when the film is developed. By using film sensitive, for example, to red, it is possible to photograph drawings done in red, while marks and notations in blue, for example, will not be photographed. This has the advantage that the animator may do his rough sketches in blue pencil and then go over them with red pencil on the lines he wants to have reproduced and it will not be necessary to erase the blue pencil marks before the drawing is photographed. Further, for example, he may make notes or write instructions on the face of the drawing in blue pencil, as none of the blue marks will be reproduced on the film.

Figure 3:
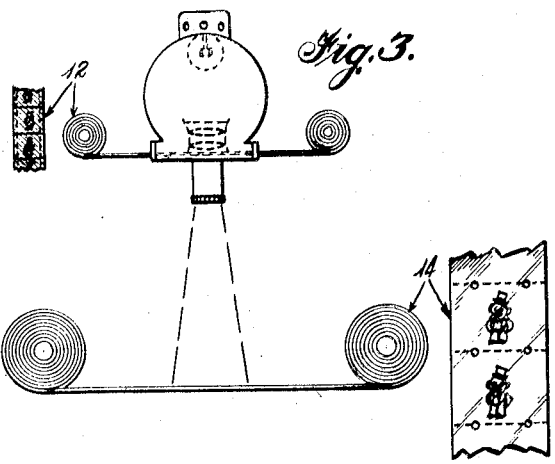
Fig. 3 is a diagrammatic view showing another step of transferring the images on the film of Fig. 2 to successive areas of a transparent strip.
Figure 4:
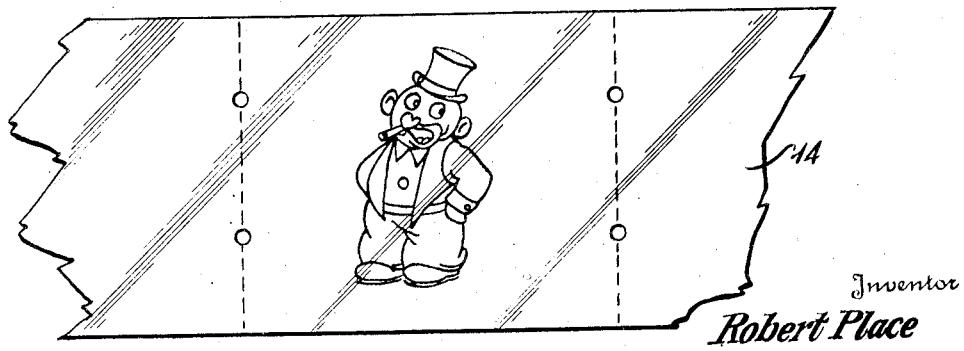
Fig. 4 is a fragmentary enlarged plan view of the transparent strip of Fig. 3.
Figure 5:
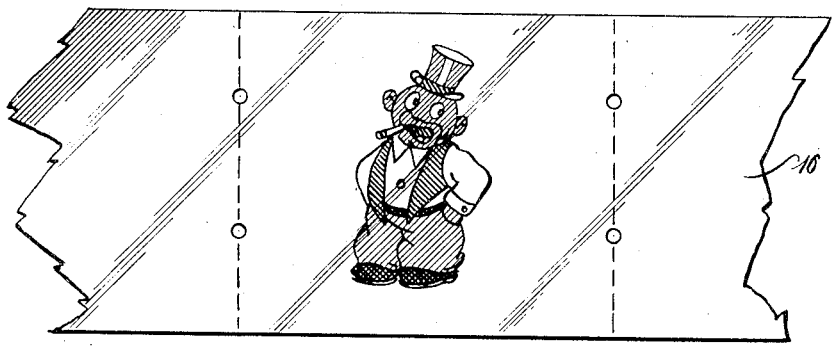
Fig. 5 is a view similar to Fig. 4 showing the image opaqued on the reverse side of the strip in varying tones or colors to complete the image.

The negative film images thus provided are then printed, as indicated in Figure 3, on successive frames or areas of a preferably larger strip of Celluloid or other transparent material 14, which has been coated with a sensitive photographic emulsion. The transparent strip 14 as well as the film 12 may have the images thereon arranged transversely of its length as shown in Figure 4 or longitudinally thereof as shown in the plan view fragments at the sides of Figure 3. Since the photographed line drawings reproduced on the strip are to be opaqued, it is preferable, particularly if a small size standard width movie film negative is used, to provide a strip having a greater width and print thereon from the negative by means of an enlarger in order that the figures may be of a more convenient size to color or opaque. The opaque coating may be applied in well known manner on the back of the strip within the area of the figures to comprise the foreground of the completed picture to prevent the background from showing through. The coating may be of any suitable material and if colored pictures are to be produced, appropriate colors may be used to opaque instead of solid black or white. A transparent strip having its series of images opaqued and completed is fragmentarily illustrated at 16 in Figure 5.

By varying the exposure, or by bleaching or dyeing the transparent strip, any tone or color in line can be produced. This is useful, particularly for color films, as a sharp black outline, such as results from India tracing ink, is not as desirable as a softer grayish outline or a colored outline.

In printing the sensitized transparent strip from the negative film, it will be apparent that the relative size of the figures can be regulated as desired by varying the distance of the strip from the negative film. In shots which show a ball or other object moving toward or away from the camera in prior processes, it was necessary to draw and trace the same object in varying sizes from the smallest size to the largest size. In my method, however, one drawing is all that is necessary, since the varying sizes may be made by adjusting the enlarging printer.

After any normal action, such as walking or running has once been animated or drawn, it need never be drawn again, as the negative film thereof can be kept on file and reproduced when the action is again wanted in any size, any position on the film and moving in either direction simply by adjusting the enlarging printer which enlarges and reproduces the negatives on the sensitized transparent strip. It will thus be apparent that the total number of drawings needed to produce a complete animated picture film according to my process is considerably less than heretofore; in some cases, as low as half as many, or even less, particularly where the same characters are repeatedly used in the same or different films.

The photographed transparent roll or strip can also be filed away for future use in a film calling for similar action. The opaque coatings, usually water colors, which would quickly dry and crack off, are preferably washed off before storing the strip. This may be easily done without affecting the photographic outlines, whereas such washing obliterates or destroys a traced outline and precludes storage for future use of traced Celluloids.

Figure 6:
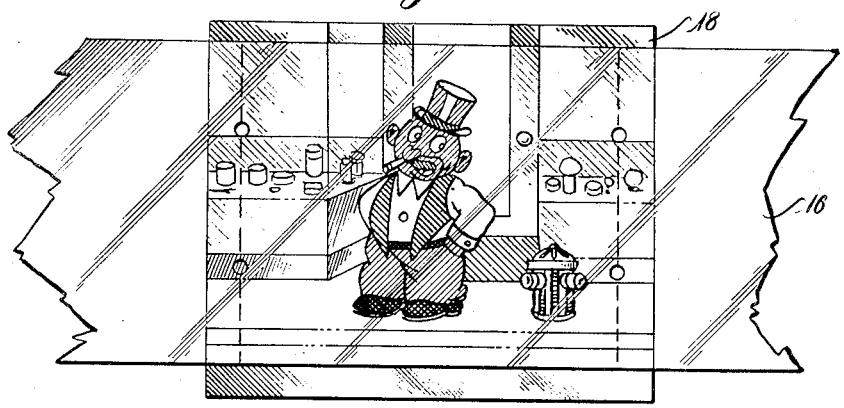
Fig. 6 is a plan view showing the completed image bearing strip of Fig. 5 superposed on a background.
Figure 7:
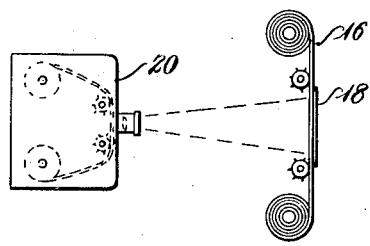
Fig. 7 is a diagrammatic view illustrating the step of photographing the series of composite pictures of Fig. 6 on successive frames of a sensitized film.

To produce the final film or master negative, the appropriately opaqued strip 16 is positioned in front of the desired background as shown at 18 in Figure 6 and the composite picture is photographed. As indicated in Figure 7 the strip may be unwound and each section or picture held in position between the camera and the background while the camera film 20 is correspondingly progressed to photograph the composite pictures in the proper order. Suitable apparatus for this purpose is available and well known in the art.

Painted backgrounds of the conventional size heretofore used are readily adaptable for use in my process and if the proportions thereof are too large for the strip pictures which comprise the foreground, the strip and background may be spaced apart sufficient distance so that the composite will be photographed by the camera in proper proportion. It will be apparent that backgrounds of any size within reasonable limits may be used and the proper proportions obtained by adusting the strip and background relative to the camera. When the background is spaced from the foreground, the same background may be subjected to various lighting effects, for example, to give the appearance of night or day, whereas with the background in contact with the foreground pictures as heretofore, separate backgrounds must be provided to produce such effects.

The fact that the novel strip of my invention is moved before the camera taking the master negative, makes particularly adaptable to the process a novel backgrounding feature wherein photographs of painted backgrounds may be used instead of the paintings themselves whose rough surfaces would become chipped off or scratch the strip when it is passed thereover. The use of such photographs is advantageous over the use of the original painted background in addition to the smooth surface thereby provided in that as many reproductions of the artist's background may be made as desired and colored or shaded to produce a variety of background effects from the same background as originally drawn. Further, photographic reproductions of backgrounds can be readily made similar in size to the strip or in any other desired size and may be reduced from the original drawing which often is relatively large better to enable the artist to introduce detail.

It is understood that the present invention embraces modifications and deviations from the method herein described such as come within the scope of the following claims.

The term "tones" appearing in the claims is used as a generic expression to include shades and colors.

I claim:

1. The method of producing animated cartoons from a series of cartoon drawings which comprises, photographically producing images of said series of drawings on successive areas of one face of a transparent strip, opaquing the opposite face of the strip within outlines of the images in varying tones to complete the cartoon images, and photographing the series of completed images from the image bearing face of the strip on successive frames of a sensitized film.

2. The method of producing animated cartoons which comprises, providing a series of cartoon drawings, photographing the series of drawings on successive frames of a sensitized film, transferring the images on said film to successive areas of one face of a transparent strip, opaquing the opposite face of the strip within outlines of the images in varying tones to complete the cartoon images, and photographing the series of completed images from the image bearing face of the strip on successive frames of a sensitized film.

3. The method of producing animated cartoons which comprises, providing a series of cartoon drawings, photographing the series of drawings in reduced size on successive frames of a sensitized film, transferring the images on said film to successive areas of one face of a transparent strip in a relatively larger size, opaquing the opposite face of the strip within outlines of the images in varying tones to complete the cartoon images, and photographing the series of completed images from the image bearing face of the strip on successive frames of a sensitized film.

4. The method of producing animated cartoons from a series of cartoon drawings which comprises, producing colored line photographic images of said series of drawings on successive areas of one face of a transparent strip, opaquing the opposite face of the strip within outlines of the images in varying tones to complete the cartoon images, and photographing the series of completed images from the image bearing face of the strip on successive frames of a sensitized film.

5. The method of producing animated cartoons which comprises, providing a series of cartoon drawings, photographing the series of drawings on successive frames of a sensitized film, producing colored line photographic images of the images on said film on successive areas of one face of a transparent strip, opaquing the opposite face of the strip within outlines of the images in varying tones to complete the cartoon images, and photographing the series of completed images from the image bearing face of the strip on successive frames of a sensitized film.

6. The method of producing animated cartoons which comprises, providing a series of cartoon drawings, photographing the series of drawings in reduced size on successive frames of a sensitized film, producing colored line photographic images of the images on said film in relatively larger size on successive areas of one face of a transparent strip, opaquing the opposite face of the strip within outlines of the images in varying tones to complete the cartoon images, and photographing the series of completed images from the image bearing face of the strip on successive frames of a sensitized film.

7. In the production of animated cartoons from a series of cartoon drawings, the method of making an image bearing strip which comprises, photographically producing images of the series of drawings on successive areas of one face of a transparent strip, and opaquing the opposite face of the strip within outlines of the images in varying tones to complete the cartoon images.

8. The method of producing an image bearing strip for use in the production of animated cartoons which comprises, providing a series of cartoon drawings, photographing the series of drawings on successive frames of a sensitized film, transferring the images on said film to successive areas of one face of a transparent strip, and opaquing the opposite face of the strip within outlines of the images in varying tones to complete the cartoon images.

9. In the production of animated cartoons from a series of cartoon drawings, the method of making an image bearing strip which comprises, producing colored line photographic images of the series of drawings on successive areas of one face of a transparent strip, and opaquing the opposite face of the strip within outlines of the images in varying tones to complete the cartoon images.

10. The method of producing an image bearing strip for use in the production of animated cartoons which comprises, providing a series of cartoon drawings, photographing the series of drawings on successive frames of a sensitized film, producing colored line photographic images of the images on said film on successive areas of one face of a transparent strip, and opaquing the opposite face of the strip within outlines of the images in varying tones to complete the cartoon images.

11. The method of producing animated cartoons from a series of cartoon drawings which comprises, photographically producing images of said series of drawings on successive areas of one face of a transparent strip, opaquing the opposite face of the strip within outlines of the images in varying tones to complete the cartoon images, placing said strip upon a photographic reproduction of a cartoon background and sliding the strip thereacross to successively arrange the series of opaqued images on said strip in coacting relation with said background and photographing the series of composite pictures on successive frames of a sensitized film.

12. The method of producing animated cartoons which comprises, providing a series of cartoon drawings, photographing the series of drawings in reduced size on successive frames of a sensitized film, transferring the images on said film to successive areas of one face of a transparent strip in a relatively larger size, opaquing the opposite face of the strip within outlines of the images in varying tones to complete the cartoon images, providing a cartoon background, photographically reproducing said background, placing said strip upon said photographically reproduced background and sliding the strip thereacross to successively arrange the series of opaqued images on said strip in coacting relation with said photographically reproduced background, and photographing the series of composite pictures on successive frames of a sensitized film.

ROBERT PLACE.